(12) United States Patent
Kulas

(10) Patent No.: US 7,840,893 B2
(45) Date of Patent: Nov. 23, 2010

(54) DISPLAY AND MANIPULATION OF WEB PAGE-BASED SEARCH RESULTS

(76) Inventor: Charles J. Kulas, 651 Orizaba Ave., San Francisco, CA (US) 94132

( * ) Notice: Subject to any disclaimer, the term of this patent is extended or adjusted under 35 U.S.C. 154(b) by 442 days.

(21) Appl. No.: 11/114,328

(22) Filed: Apr. 25, 2005

(65) Prior Publication Data

US 2006/0242553 A1 Oct. 26, 2006

(51) Int. Cl.
*G06N 3/00* (2006.01)
(52) U.S. Cl. .................. 715/234; 707/999
(58) Field of Classification Search ............. 715/513, 715/517, 523, 530, 234, 243, 255, 254; 707/999
See application file for complete search history.

(56) References Cited

U.S. PATENT DOCUMENTS

| | | | |
|---|---|---|---|
| 6,338,059 B1 * | 1/2002 | Fields et al. .................. 707/4 |
| 6,532,481 B1 * | 3/2003 | Fassett, Jr. .................. 707/203 |
| 7,272,610 B2 * | 9/2007 | Torres .................. 707/101 |
| 2004/0143564 A1 * | 7/2004 | Gross et al. .................. 707/1 |
| 2008/0120289 A1 | 5/2008 | Golan et al. | |

OTHER PUBLICATIONS

User's Manual for the Examiners Automated Search Tool (EAST), Jul. 22, 1999.*

* cited by examiner

*Primary Examiner*—Kyle R Stork
(74) *Attorney, Agent, or Firm*—Perkins Coie LLP

(57) ABSTRACT

A system for displaying and re-ordering web page search results. Results obtained from a search engine site are displayed with same-type fields in same columns. A button at the top of each column allows result entries to be organized alphanumerically depending upon values for the fields in the column. A subsearch feature allows additional searching of a base search. The subsearch can be performed on any one or more of the fields.

33 Claims, 7 Drawing Sheets

| # | TITLE 242 | CONTENT 244 | LINK 246 | 248 | 250 | 252 |
|---|-----------|-------------|----------|-----|-----|-----|
| 1 | PTO brings the US patent system into the digital age | ... Mission: Paperless filing and electronic management of patent applications ... What was: Files of paper documents ... Better, faster data has clear rewards ... | www.gcn.com/ 23_30/news/ 27511-1 | March 26, 2005 | 55k | html © ⓢ |
| 2 | No. 1163: A Better Mousetrap | To build a better mousetrap -- that people will use. ... By now the Patent Office has issued over 4400 mousetrap patents. Yet only twenty or so of those ... | www.uh.edu/ engines/epi1163 | Jan 1, 2005 | 8k | html © ⓢ |
| 3 | Avoiding Patent, Copyright and Trademark Problems | ... Better Mousetraps; Avoiding Patent Infringement; Avoiding Trademark ... If a man can make a better mousetrap, though he builds his house in the woods ... | www.piercelaw.edu /field/avoid | Jan 8, 2005 | 19k | html © ⓢ |
| 4 | The Better Mousetrap - BountyQuest: Let the Hunt Begin | ... THE BETTER MOUSETRAP • BountyQuest: Let the Hunt Begin ... launched a new Web site that has fired the imagination of professional patent searchers. ... | www.infotoday.co m/searcher/ may01/lambert | | 31k | html © ⓢ |
| 5 | The Better Mousetrap - Derwent on Delphion: An Experiment | ... THE BETTER MOUSETRAP • BountyQuest: Let the Hunt Begin ... launched a new Web site that has fired the imagination of professional patent searchers. .... | www.infotoday.co m/searcher/ may01/lambert | March 27, 2005 | 37k | html © ⓢ |
| 6 | City Pages - Yankee ingenuity from the US Patent Office, Better ... | ... Yankee ingenuity from the US Patent Office, Better Mousetrap Department. by Joseph Hart January 14, 1998. 5528853: ... When a mouse steps onto the grid ... | www.gcn.com/ 23_30/news/ 27511-1 | March 20, 2005 | 28k | html © ⓢ |

Figure 3

| # | TITLE 242 | CONTENT | LINK | | |
|---|---|---|---|---|---|
| 105 | Andrew Hargadon/ Not better mousetraps but better networks | ... "Build a better mousetrap, and the world will beat a path to your door." ... Since the US Patent and Trademark Office opened in 1828, more than 4400 ... | www.post-gazette.com/pg/05081/475105.stm | 18k | stm ©Ⓢ |
| 87 | Articles - What You Don't Know Can Hurt You | ... Everyone has heard the saying—build a better mousetrap, and the world will ... instead of mousetrap, that patent would not be uncovered by the search. ... | www.pierceatwood.com/showarticle.asp?S how=62 | Jan 10, 2004 | html ©Ⓢ |
| 30 | AU Research News - April1999 | ... Deciding who should be included as a co-inventor on a patent application is a ... So you've "built a better mousetrap" and you're off to your university ... | www.auburn.edu/research/ vpr/communications/resnews/apr99.html | Mar 8, 2004 | html ©Ⓢ |
| 3 | Avoiding Patent, Copyright and Trademark Problems | ... Better Mousetraps; Avoiding Patent Infringement; Avoiding Trademark ... If a man can make a better mousetrap, though he builds his house in the woods ... | www.piercelaw.edu/tfield/avoid | Jan 8, 2005 | html ©Ⓢ |
| 72 | AVOIDING PATENT, TRADEMARK AND COPYRIGHT PROBLEMSThe Better Mousetrap - Derwent on Delphion: An Experiment | File Format: PDF/Adobe Acrobat - View as HTML ... happen if it turns out that someone else actually has a current patent on one or more features of the better mousetrap. By failing to consider the ... | www.sba.gov/library/pubs/pi-2.pdf | | pdf |
| 190 | Avoiding Patent, Trademark and Copyright Problems Avoiding Patent ... | File Format: PDF/Adobe Acrobat - View as HTML ... turns out that someone else actually has a current patent on one or more. features of the better mousetrap. By failing to consider the intellectual ... | www.nsbdc.org/resources/documents/images/patent.pdf | | pdf Ⓢ |

DISPLAY AND MANIPULATION OF WEB PAGE-BASED SEARCH RESULTS

BRIEF DESCRIPTION OF THE DRAWINGS

FIG. 3 illustrates a search results display according to an embodiment of the invention;

FIG. 4 shows a reordering of entries after a title button is depressed;

FIG. 5 shows a subsearch on content fields;

DETAILED DESCRIPTION OF THE INVENTION

One popular use of the Internet and World Wide Web (WWW) is to perform searches of content on the Internet. Users can use search engines such as at www.google.com, www.yahoo.com, www.alltheweb.com, www.askjeeves.com, etc. to find information based on simple search queries such as keyword searches.

Figure 1:
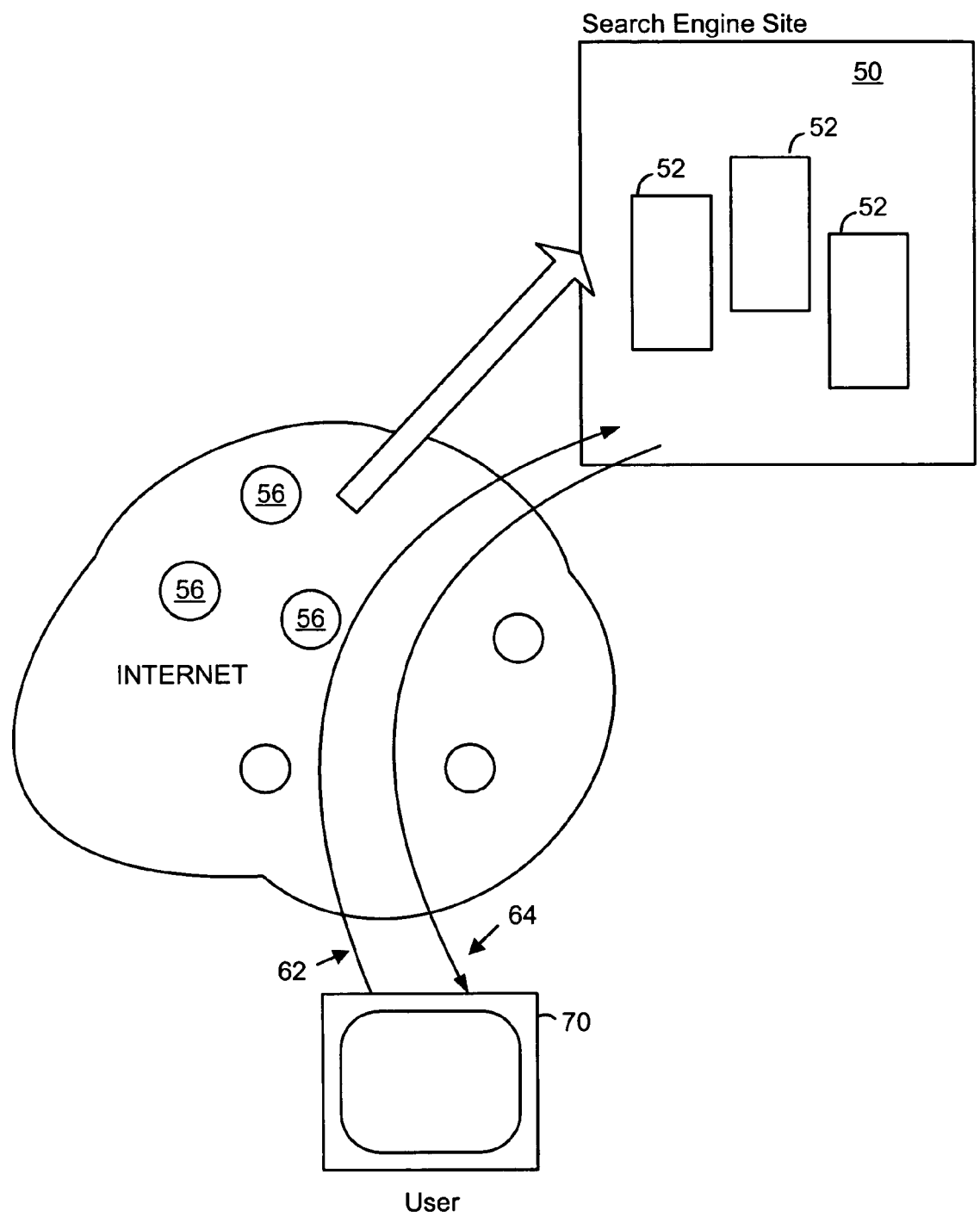
FIG. 1 illustrates basic concepts of a network search engine.

FIG. 1 illustrates basic concepts of a search engine. In FIG. 1, search engine site 50 includes processors such as computers 52. The processors, along with other computing resources such as communications channels, storage, etc., are used to obtain information from nodes on a network, such as Internet 54. Internet nodes 56 can include any processing, storage, transfer or other type of information handling software, hardware, or communication channels. For example, typical types of nodes that are interrogated or "crawled" with search engines include web sites hosted on server computers, databases, etc.

The information obtained from the Internet nodes is transferred to the search engine site. Although specific times and places of processing may be discussed, in general it should be understood that the steps, functions or other processing according to embodiments of the present invention can be carried out at different times and places and still achieve desired results. For example, obtained information need not be stored and/or processed at the search engine site, but can be stored or processed at different sites. Processing and storage of search results can occur at different times (or concurrently) and at different places, as desired.

A user at computer 70 can provide a search query to search engine site 50 as shown at 62. The result of the query is typically a web page, or pages, that include multiple results. The user can further investigate details of the results, revise the query, enter subsequent queries, or perform other actions using links, buttons or controls provided on the results page.

Figure 2:
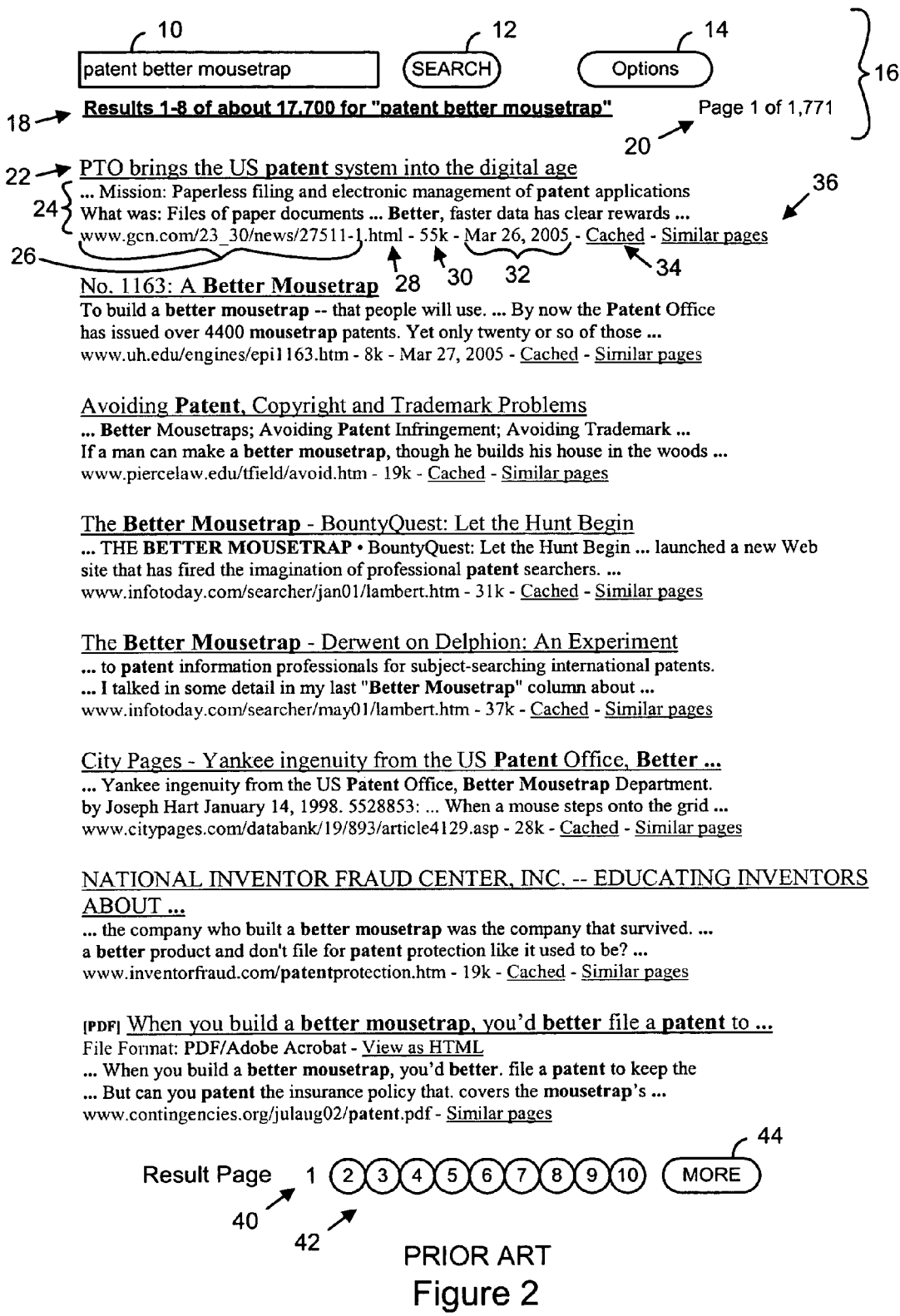
FIG. 2 shows an example of a search results web page.

An example of a search results page is shown in FIG. 2. Text box 10 shows the current search term, or query, typed by the user as "patent better mousetrap". Search button 12 is activated after the user to submit the query to the search engine site. Options control 14 allows the user to set various parameters of the search such as the number of results returned on each page, searching for pages in a specific language, within a specific date range, etc.

FIG. 2 shows a prior art search results page after the user has clicked on, or otherwise activated, search button 12. A summary of the results is shown at 18 by the text "Results 1-8 of about 17,700 for 'patent better mousetrap'". The current page shows 8 results that are set off by a blank line from each other. The text at 20 shows that the page in FIG. 2 is the first page of about 1,771 possible pages of results.

A typical search engine returns the search results with a ranking that is intended to list the most relevant results first. Since the example query "patent better mousetrap" is a typical keyword-type of search, the search engine locates target objects such as web pages, files, documents, etc. that include each of the three keywords "patent," "better" and "mousetrap" within the target document. Usually a higher ranking is given for certain conditions such as if the keywords are close together, occur more frequently, are in the title of the document, etc. Different search engines can use different ranking rules and the rules can be very sophisticated and analytical.

As shown in FIG. 2, each result is displayed on the result page as a paragraph with an underlined title at the top. The first, or topmost result has a title 22 "PTO brings the US patent system into the digital age". The occurrence of the keyword "patent" is emboldened as are the other keywords when they occur. Title 22 is also a hyperlink that, when clicked, will retrieve the corresponding document from the document's host site and display the document on the user's computer.

Content 24 represents a portion of the body of the target document. In the case of the present search engine, a few words before and/or after one or more of the keywords are displayed. In some search engines the number of occurrences of the keywords and the preceding or trailing words can be specified as, for example, by using options control 14.

Other portions of the result include a hyperlink in a uniform resource locator (URL) format at 26 that shows the domain, subdomains, subdirectories and document name. A preferred embodiment of the invention assumes a general format for information such as identifiers, pointers, filenames, etc., according to standards and protocols associated with the Internet such as URL, hypertext markup language (HTML or HTM), Transfer Control Protocol, Internet Protocol (TCP/IP), etc. In other embodiments, different formats and standards can be used. For example, a pathname to an object can be specified in a different format than a URL. In general, any formats for identification, transfer, control or other processing of information can be employed.

The document type is indicated at 28 as html. The document size is 55 kilobytes as shown at 30. The date is listed at 32. A linked to a cached version (i.e., an older version) is available as shown by the hyperlink "Cached" at 34. The search engine result also provides a link to similar pages at 36.

Other results have a similar layout as shown. In some cases, certain of the information (e.g., date, cached version) may be omitted or unavailable.

At the bottom of the page in FIG. 2 is a page selector control that indicates the current page at 40 (by not displaying the page number in a button) and pages 2-10 that are selectable via buttons at 42. Each time a different page is selected, a request for that page is sent to a device on the Internet (e.g., at the search engine site, at a node such as a cache or mirror site, etc.) that is remote from the user's local computer system. Each page access results in a fixed number of results (e.g., 10-50) displayed on a page. The user can view the results by scrolling up or down within the page. More pages other than those accessible by the buttons at 42 are available by using MORE button 44.

FIG. 3 illustrates a search results display according to an embodiment of the invention. In FIG. 3, user interface 200 includes menu bar 210 having menu titles File 202, View 204, Options 206 and Help 208. These (and additional) menus can include functions or commands that are known in the art such as file save, save as, view print layout, view web layout, help, etc. In general any type of functions can be provided especially common types of computer interface functions. Importantly, Options menu 206 allows the user to set parameters and provides other features, discussed below, for customizing or configuring various aspects of the results display. Although specific user interface controls, such as menus, buttons, sliders, text boxes, windows, etc., are discussed, in general any suitable type of user input or output mechanism or format can be used. For example, other types of user interface designs can use a command line input/output, three-dimensional displays, virtual reality renderings, etc.

User interface 200 of FIG. 3 includes search text box 212. A user enters a basic search, such as a prior art keyword search, into search text box 212 and upon pressing the RETURN button on a computer keyboard the search query is sent to a search engine. Pull-down tab 214 presents a list of prior searches that were entered. Retrieval counter 216 shows the number of results that have been obtained from the network and that are available locally at the user's computer system. In the example of FIG. 3, 200 of the possible 17,000 search results have been obtained and stored at the user's local computer system. In a preferred embodiment, the number of retrieved documents continues to increase as more results are automatically obtained from the search engine site over time. As the user is working, additional results can be requested up to a limit number that is set by the user in the Options menu.

The number of results that is obtained from the search engine site can usually also be set as an option at the search engine site. For example, 10, 20, 50, etc. results might be returned for each page that the search engine site provides. For example, a results page such as that shown in FIG. 2 would typically be returned for each manual request made by a user. Instead, a preferred embodiment automatically requests successive pages until a desired total number of retrieved results is obtained. The retrieved result count is updated in real time as the results are received at the user's local computer system. Note that the concept of a "local" computer system can include resources (e.g., processors, memory, disk storage, etc.) that is not necessarily in geographical proximity to the human user. The concept of a local system, in general, includes such resources that are not primarily under the search engine site's control and can be physically distant from a user. For example, the user may own more than one computer in different locations and both can work in concert to achieve functionality as described herein. Or a secondary search service can provide computing resources to users and such resources (e.g., a website, server computer, etc.) can be considered as local resources for different users insofar as the secondary company's resources implement the functionality of embodiments described herein.

Once the target number of documents has been obtained locally, a user can click on "Get More" button 220 to obtain additional increments of results. For example, clicking on Get More button 220 will cause an additional 200 results to be retrieved to bring the total locally-stored results to 400. In other embodiments, a range of results (e.g., 0-500, 2200-5000, etc.) can be specified.

Subsearch text box 224 allows the user to specify a search on different fields of results. This feature is described in more detail, below. Subsearches are stored and can be displayed by using a drop-down list accessed by tab 226. The subsearch is applied to different fields, arranged in columns, by clicking buttons 230. Each result is shown in a row as, for example, result 260.

Header buttons include rank button 240, title button 242, content button 244, link button 246, date button 248, size button 250 and file type button 252. Each header button, when clicked, causes a reordering of result entries according to values in the column to which the header button corresponds. For example, depressing rank button 240 causes the result entries to be arranged according to values in the rank fields, which are in the left-most column. As shown in FIG. 3, the results are arranged according to their rank numbers. This is the order in which the results are returned by the search engine. However, a rank number is assigned to each result entry for purposes of easily obtaining the initial ordering provided by the search engine if the initial result ordering is modified by operations described below.

Although FIG. 3 only shows the first 6 results, other embodiments can show any arbitrary number of results depending on screen size, text size, etc. Slider control 254 can be used to bring additional result entries into view by moving the slider downward to view later-ordered results, or by moving the slider upward to view earlier-ordered results.

Depressing any of the header buttons can cause a reordering of the search results according to values of result entries in the associated column. For example, depressing title button 242 causes a reordering of results alphabetically according to the titles in the title column.

FIG. 4 shows a reordering of entries after title button 242 is depressed. The entries are no longer in rank order (column 300) but, instead, have been reordered alphabetically according to the titles. The corresponding rank numbers are therefore shown out-of-order. The original rank ordering can be achieved again by depressing rank button 240. In a preferred embodiment, reordering can be by any of the fields. If a column button is pressed while the fields are already ordered according to field values in the column then the entries are placed in a reverse order with respect to values in the column. For example, if rank button 240 is pressed in FIG. 4, the result would be the display of FIG. 3 where the entries are displayed in rank order. Depressing the rank button again will cause the entries to be displayed in reverse order so that entry 200 (assuming 200 search results are retrieved) is at the top followed by 199,198, 197, etc.

Slider control 254 is used to view additional entries that follow the last (bottommost) entry in FIG. 4.

Ordering the search results according to title is useful in searches that return result pages that have regular naming conventions (e.g., academic papers, medical or biological research papers, etc.). Title-based ordering can also have additional benefits and can be used with other controls and features to assist in searches. For example, redundant titles can be detected such as the bottom 3 entries of FIG. 4. These same titles might be inferred to have the same information and can be manually or automatically filtered from the results display.

Other useful fields for alphanumeric value reordering include the date field, file size and file type fields. Although in many cases on the Internet, documents are not conveniently marked with a true date (as shown by date omissions in FIG. 4) some types of information, such as newsgroups, forum postings, etc., will provide consistent dates on all data items. Thus, depending on the types of information or fields and the way they are maintained in different results and items, ordering by different fields can have different advantages. File size and type ordering can be useful for a user to eliminate incompatible or undesirable file types. A user may be looking for a large document, article, file or other item and can easily arrange the entries by file size and then scroll to the desired sizes. Many other advantages of field ordering are possible— especially when used in conjunction with other search, ordering, filtering and organization functions. In general, such operations that act to modify an organization of a display of search results are referred to herein as "arrangement operations."

In addition to the column buttons, another type of arrangement operation provided by an embodiment of the invention includes a "subsearch" feature. A subsearch allows a user to perform a keyword, Boolean, logical or any other type of search on a first set of search results. For example, common techniques can be used such as allowing combinations of words to be joined with AND or OR operators, using parentheses or quotation marks to group words into phrases, using "+" or "−" symbols to force inclusion or exclusion of words, specifying a range within which two or more words must exist for a match (e.g., "spring w/10 clamp"—meaning the two words must exist within 10 words of each other), etc. Any search syntax, technique, interface or other features can be used in either the base search or subsearch.

Figure 5:
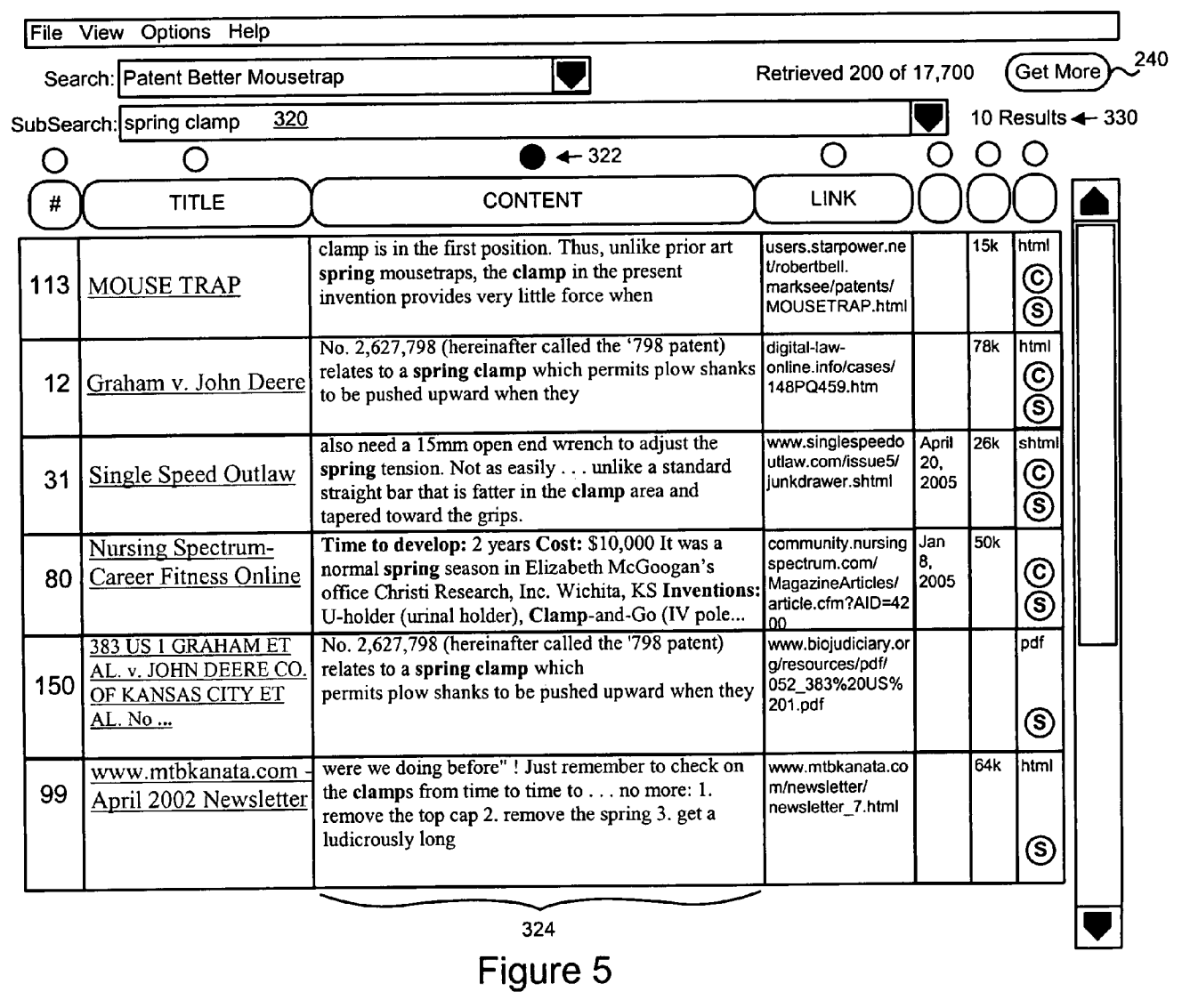

FIG. 5 shows a subsearch that requires the terms "spring" and "clamp" specified at text box 320 to be included in content fields of the retrieved results. In FIG. 5, tie button 322 has been clicked by the user to indicate that the subsearch is to be applied to the content fields. Any other field can be applied with the subsearch by using the tie button above the field's column. In other embodiments, multiple fields can be applied with the same or different subsearches.

In FIG. 5, the subsearch provides 10 results (only the first 6 are shown) from the set of 200 retrieved results from the base search ("Patent Better Mousetrap"). The number of subsearch results is indicated at 330. If the system retrieves more results from the base search (e.g., by the user depressing Get More button 220, by the system continuing to obtain results, etc.) then the number of subsearch results can increase as more base results are obtained that meet the subsearch criteria. The subsearch results are ordered according to a ranking formula based on the subsearch. For example, the ranking criteria can be the number of times that keywords ("spring" and "clamp" in this example) appear in the content field, whether the keywords are in a title or other heading within a document or page, how close together the keywords appear, etc. The ranking formula can be the same as for the base search, or a different formula can be used.

In a preferred embodiment, when a content field is chosen as the target of a subsearch, the entire target document can be used as the subject of the subsearch. The target documents can be obtained from the search engine site or they can be retrieved via the Internet by accessing the sites where the target documents reside. Alternatively, only the content returned by the search engine site as a result of the base search can be used in a subsearch. Or a degree of content that is somewhere in-between, or different content entirely, can be used. In a preferred embodiment, the user has an option to specify how a subsearch of the content field is handled. A user can select whether or not to retrieve the target document for a content subsearch. Another option allows a user to specify whether to retrieve other associated pages (e.g., subsequent pages of a multi-page article) and use them in the content search. Other approaches to selecting content for a content subsearch are possible.

Tables I-VII below show a portion of a result page source text in a hyper-text markup language (HTML) format. The Tables, when assembled together in order, make up a portion that includes the start of an HTML file used to generate the displayed page of information in FIG. 2. For purposes of illustration, only the source text for a first few results entries is provided. Note that other embodiments can use different formats of source text and different ways to display the result information. In general, aspects of embodiments of the invention can be adapted to work with information in any format. For example, plain-text, extended markup language (XML), java, image formats such as gif, jpg, etc. and other information formats can be used. In general, any suitable format, protocol, specification or other standard or design may be employed for any aspect of the invention, as desired.

TABLE I

```
<html><head><meta HTTP-EQUIV="content-type"
CONTENT="text/html;
charset=UTF-8"><title>Google Search: patent better mousetrap
</title><style><!--
body,td,div, .p,a{font-family:arial, sans-serif }
div, td{color:#000}
.f, .fl:link{color:#6f6f6f}
a:link, .w, a.w:link, .w a:link{color:#00c}
a:visited, .fl:visited{color:#551a8b}
a:active, .fl:active{color:#f00}
.t a:link, .t a:active, .t a:visited, .t{color:#000}
.t{background-color:#e5ecf9}
.k{background-color:#36c}
.j{width:34em}
.h{color:#36c}
.i, .i:link{color:#a90a08}
.a, .a:link{color:#008000}
.z{display:none}
div.n {margin-top: 1ex}
.n a{font-size:10pt; color:#000}
.n .i{font-size:10pt; font-weight:bold}
.q a:visited, .q a:link, .q a:active, .q {color: #00c; }
.b{font-size: 12pt; color:#00c; font-weight:bold}
.ch{cursor:pointer;cursor:hand}
.e{margin-top: .75em; margin-bottom: .75em}
```

TABLE II

```
.g{margin-top: 1em; margin-bottom: 1em}
//-->
</style>
<script>
<!--
function ss(w){window.status=w;return true;}
function cs( ){window.status='';}
function ga(o,e){if (document.getElementById){a=o.id.substring(1);
p = "";r = ""; g = e.target;if (g) { t =
g.id;f = g.parentNode;if (f) {p = f.id;h =
f.parentNode;if (h) r = h.id;}} else{h = e.srcElement;f =
h.parentNode;if
(f) p = f.id;t = h.id;}if (t==a || p==a || r==a) return
true;location.href=document.getElementById(a).href}}
//-->
</script>
</head><body bgcolor=#ffffff onLoad="document.gs.reset( )"
topmargin=2
marginheight=2><table border=0 cellpadding=0 cellspacing=0><tr><td
valign=top><a href="http://www.google.com/webhp?hl=en"><img
src="/images/logo_sm.gif" width=150 height=55 alt="Go to
Google Home"
border=0 vspace=12></a></td><td>  </td><td
valign=top><table
cellpadding=0 cellspacing=0 border=0><tr><td height=14
valign=bottom><script><!--
function qs(el) {if (window.RegExp && window.encodeURIComponent)
{var
qe=encodeURIComponent(document.gs.q.value);if
(el.href.indexOf("q=")!=-1)
{el.href=el.href.replace(new RegExp("q=[^&$]*"),"q="+qe);} else
{el.href+="&q="+qe;}}return 1;}
// -->
```

TABLE III

</script><table border=0 cellpadding=4 cellspacing=0><tr><td class=q><font size=−1><font color=#000000><b>Web</b></font>    <a id=t1a class=q href="http://images.google.com/images?q=patent+better+mousetrap&hl=en&lr=&sa=N&tab=wi" onClick="return qs(this);">Images</a>    <a id=t7 class=q href="http://groups-beta.google.com/groups?q=patent+better+mousetrap&hl=en&lr=&sa=N&tab=wg" onClick="return qs(this);">Groups</a>    <a id=t4a class=q href="http://news.google.com/news?q=patent+better+mousetrap&hl=en&lr=&sa=N&tab=wn" onClick="return qs(this);">News</a>    <a id=t5a class=q href="http://froogle.google.com/froogle?q=patent+better+mousetrap&hl=en&lr=&sa=N&tab=wf" onClick="return qs(this);">Froogle</a>    <a id=t7a class=q href="http://local.google.com/local?q=patent+better+mousetrap&hl=en&lr=&sa=N&tab=wl" onClick="return qs(this);">Local</a><sup><a href="http://local.google.com/local?q=patent+better+mousetrap&hl=en&lr=&sa=N&tab=wl" style="text-decoration:none;" onclick="return qs(this);"><font color=red>New!</font></a></sup>    <font size=−1><a class=q onClick='return window.qs?qs(this):1' href='http://127.0.0.1:4664/search&s=2447570477?q=patent+better+mousetrap'>Desktop</a></font>    </font><font size=−1><b><a href="/options/"

TABLE IV class=q>more »</a></b></font></td></tr></table></td></tr><tr><td>
<table border=0 cellpadding=0 cellspacing=0><tr><td nowrap><form name=gs method=GET action=/search><input type=hidden name=hl value="en"><input type=hidden name=lr value=""><input type=text name=q size=41 maxlength=2048 value="patent better mousetrap"><font size=−1> <input type=submit name="btnG" value="Search"><span id=hf></span></font></td><td nowrap><font size=−2>  <a

TABLE IV-continued href=/advanced_search?q=patent+better+mousetrap&hl=en&lr=>Advanced Search</a><br>  <a href=/preferences?q=patent+better+mousetrap&hl=en&lr=>Preferences</a>    </font></td></tr></table></td></tr></table><table cellpadding=0 cellspacing=0 border=0><tr><td><font size=−1></font></td></tr><tr><td height=7><img width=1 height=1 alt=""></td></tr></table></td></tr></form></table>
<style><!--
.fl:link{color:#7777CC}
-->

TABLE V

</style>
<table width=100% border=0 cellpadding=0 cellspacing=0><tr><td bgcolor=#3366cc><img width=1 height=1 alt=""></td></tr></table><table width=100% border=0 cellpadding=0 cellspacing=0 bgcolor=#e5ecf9><tr><td bgcolor=#e5ecf9 nowrap><font size=+1> <b>Web</b></font> </td><td bgcolor=#e5ecf9 align=right nowrap><font size=−1 color=>Results <b>1</b> - <b>10</b> of about <b>17,700</b> for <b><a href=/url?sa=X&oi=dict&q=http://www.answers.com/patent%26r%3D67 title="Look up definition of patent"><b>patent</b></a><b> </b><a href=/url?sa=X&oi=dict&q=http://www.answers.com/better%26r%3D67 title="Look up definition of better"><b>better</b></a><b> </b><a href=/url?sa=X&oi=dict&q=http://www.answers.com/mousetrap%26r%3D67 title="Look up definition of mousetrap"><b>mousetrap</b></a></b>. (<b>0.23</b> seconds)  </font></td></tr></table><!--tro2--><!--a-->
<div><p class=g><!--m--><a href=http://www.gcn.com/23_30/news/27511-1.html>PTO brings the US <b>patent</b> system into the digital age</a><br><font size=−1><b>...</b> Mission: Paperless filing and electronic management of <b>patent</b> applications<br>
What was: Files of paper documents <b>...</b> <b>Better</b>, faster data has clear rewards <b>...</b><br><font color=#008000>www.gcn.com/23_30/news/27511-1.html - 55k - Mar 26, 2005 - </font><nobr> <a class=fl href="http://64.233.179.104/search?q=cache:TsLg877I4SMJ:www.gcn.com/23_30/news/27511-1.html+patent+better+mousetrap&hl=en">Cached</a> - <a class=fl href="/search?hl=en&lr=&q=related:www.gcn.com/23_30/news/27511-1.html">Similar pages</a></nobr></font><!--n--> <p class=g><!--m-->

TABLE VI

```
<a href=http://www.uh.edu/engines/epi1163.htm>No. 1163: A <b>Better</b>
<b>Mousetrap</b></a><br><font size=-1>To build a <b>better</b>
<b>mousetrap</b> -- that people will use. <b>...</b> By now the
<b>Patent</b> Office<br>
has issued over 4400 <b>mousetrap</b> patents. Yet only twenty or so of
those <b>...</b><br><font color=#008000>www.uh.edu/engines/epi1163.htm -
8k - Mar 27, 2005 - </font><nobr> <a class=fl
href="http://64.233.179.104/search?q=cache:oyIjmAMfbgYJ:www.uh.edu/engines/
epi1163.htm+patent+better+mousetrap&hl=en">Cached</a> - <a class=fl
href="/search?hl=en&lr=&q=related:www.uh.edu/engines/epi1163.htm">Similar 
pages</a></nobr></font><!--n--> <p class=g><!--m--><a
href=http://www.piercelaw.edu/tfield/avoid.htm>Avoiding <b>Patent</b>,
Copyright and Trademark Problems</a><br><font size=-1><b>...</b>
<b>Better</b> Mousetraps; Avoiding <b>Patent</b> Infringement; Avoiding
Trademark <b>...</b><br>
If a man can make a <b>better</b> <b>mousetrap</b>, though he builds his
house in the woods <b>...</b><br><font
color=#008000>www.piercelaw.edu/tfield/avoid.htm - 19k - </font><nobr> <a
class=fl
href="http://64.233.179.104/search?q=cache:ib9SZVD98ewJ:www.piercelaw.edu/t
field/avoid.htm+patent+better+mousetrap&hl=en">Cached</a> - <a class=fl
href="/search?hl=en&lr=&q=related:www.piercelaw.edu/tfield/avoid.htm">Similar
 pages</a></nobr></font><!--n--> <p class=g><!--m--><a
href=http://www.infotoday.com/searcher/jan01/lambert.htm>The <b>Better</b>
```

TABLE VII

```
<b>Mousetrap</b> - BountyQuest: Let the Hunt Begin</a><br><font size=-1>
<b>...</b> THE <b>BETTER</b> <b>MOUSETRAP</b> . BountyQuest: Let the Hunt
Begin <b>...</b> launched a new Web<br>
site that has fired the imagination of professional <b>patent</b>
searchers. <b>...</b><br><font
color=#0008000>www.infotoday.com/searcher/jan01/lambert.htm - 31k -
</font><nobr> <a class=fl
href="http://64.233.179.104/search?q=cache:JslPHwsZI7oJ:www.infotoday.com/searcher/
jan01/lambert.htm+patent+better+mousetrap&hl=en">Cached</a> - <a
class=fl
href="/search?hl=en&lr=&q=related:www.infotoday.com/searcher/jan01/lambert.
htm">Similar pages</a></nobr></font><!--n--> <blockquote class=g><p
class=g><!--m--><a
href=http://www.infotoday.com/searcher/may01/lambert.htm>The <b>Better</b>
<b>Mousetrap</b> - Derwent on Delphion: An Experiment</a><br><font size=-1>
<b>...</b> to <b>patent</b> information professionals for subject-
searching international patents.<br>
<b>...</b> I talked in some detail in my last "<b>Better</b>
<b>Mousetrap</b>" column about <b>...</b><br><font
color=#008000>www.infotoday.com/searcher/may01/lambert.htm - 37k -
</font><nobr> <a class=fl
href="http://64.233.179.104/search?q=cache:j5v5NypQ2EIJ:www.infotoday.com/searcher/
may01/lambert.htm+patent+better+mousetrap&hl=en">Cached</a>
```

When a file such as that shown in Tables I-VII is received by a processor (e.g., user computer 70 in FIG. 1) the file is parsed by a program executing on the user computer to detect multiple fields for each entry. For example, the title of the first entry (see FIG. 2) can be found in the 16$^{th}$ line of source text from Table VI that includes "PTO brings the US <b>patent</b>system into the digital age". Tags such as <b>and </b>the indicate formatting (e.g., emboldening) can be omitted from reproduction in a field, or can be rendered so that the formatting information is included in a field. Various techniques for parsing the source text can be employed. For example, an end-of-table tag such as "</table>" can be used as an indication that result entry data is about to follow. If, as shown in Table V, the format returned by the search engine is known to consistently use comment markers such as "<!--tro2--><!--a--><div><p class=g><!--m-->" immediately preceding a hyperlink ("<a href=http://www.gcn.com/23_30/news/27511-1.html>") and title ("PTO brings the US <b>patent</b>system into the digital age") then that information can be used to parse the source text. Other techniques can be used.

A content field associated with the title can similarly be detected as following the title and being set off by delimiters such as (shown in Table V) a change in font size, "<font size=-1>", embolding tags and leading ellipses symbols "<b> . . . </b>", etc. For the first result entry the content field includes " . . . Mission: Paperless filing and electronic management of patent applications" as the first sentence. Additional sentences are detected and placed in the content field for the entry of rank 1 as shown in FIG. 3. Similarly, other fields such as a link name, date, file size and file type are detected and inserted into the corresponding field.

The fields can be stored in a separate file, spreadsheet, web page or other data structure. In other embodiments, additional or different fields can be detected and selectively displayed. A user may be provided with options as to how fields are detected and displayed (e.g., whether or not to display fields). Supplemental or additional information (e.g., other than that provided by the source text) can be obtained and displayed.

Figure 6:
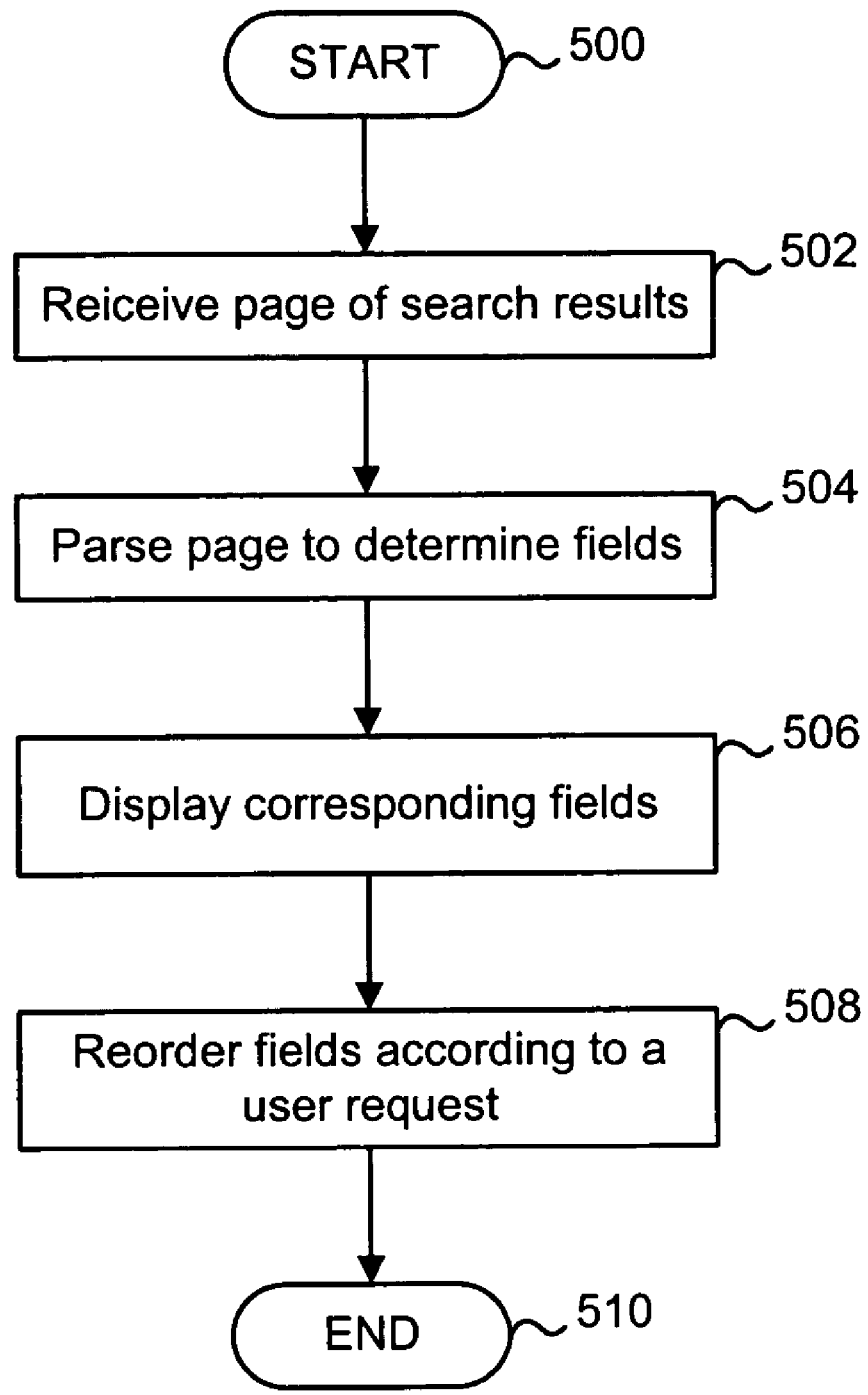
FIG. 6 shows basic steps in a routine to present search results according to a preferred embodiment of the invention.

FIG. 6 shows basic steps in a routine to present search results according to a preferred embodiment of the invention.

In FIG. 1, the routine is entered at step 500 when it is desired to display search results. At step 502 a page of search results is received from a source such as a search engine site. In a preferred embodiment, results pages continue to be received and parsed while subsequent steps of FIG. 6 are performed.

At step 504 the received page is parsed to determine fields. Such parsing can include the techniques described herein or can include other techniques. Once field values or other field information is obtained the field information is displayed in associated form. In a preferred embodiment, the field information is arranged in columns as shown, e.g., in FIGS. 3-6, where the same fields among multiple result entries are arranged in the same column. Other field layouts can be used, such as presenting the information in a diagram, corresponding rows, three-dimensional form, etc.

At step 508 the fields are reordered according to a user request. in a preferred embodiment, a program executing at a user's local computer system receives signals from a user input device (e.g., a mouse, keyboard, etc.) to allow arrangement operations (e.g., alphabetic order, numeric order, range selection, keyword searching, logical or Boolean searching, etc.) based on one or more values of the fields or other characteristics of information in the search results. The routine exits at step 510.

Functionality can be provided in any suitable manner. For example, the steps of FIG. 6 can be performed locally at a user's (e.g., "client") computer system. In some embodiments it may be possible and desirable to perform some of the processing for certain functions at one or more different locations. For example, the system can operate as a web interface running on a remote server computer. The user is presented with the output, or display, of results and controls in the form of a web page that can be accessed, e.g., at a device such as a computer, mobile phone, game console, etc. In other designs, portions of the functionality can be performed at any one or more locations by a process or processes.

Any suitable programming language and techniques can be used. In addition to HTML, XML, and other markup languages; Java, PHP, CGI script, etc. can be employed. The functionality can be adapted for use with any suitable operating system, hardware, platform or environment. Executable or interpreted code or instructions can be used. Aspects of the functionality can be provided by application programs, operating systems, applets, plug-ins, libraries, utilities, firmware, or other type of hardware or software or combination of hardware and software.

Figure 7:
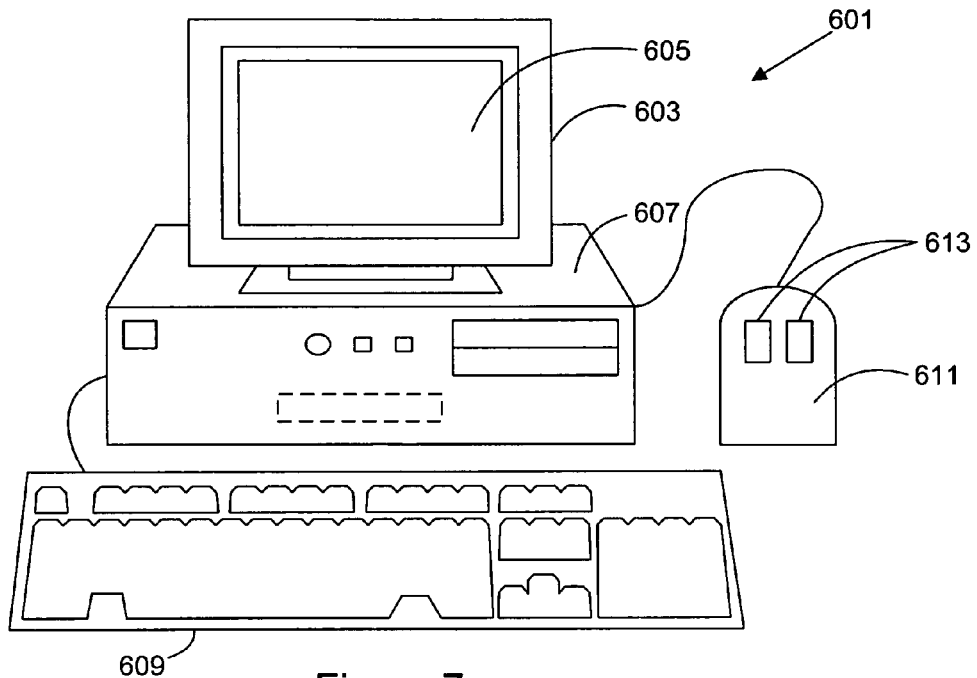
FIG. 7 illustrates a computer system suitable for use with the present invention.
Figure 8:
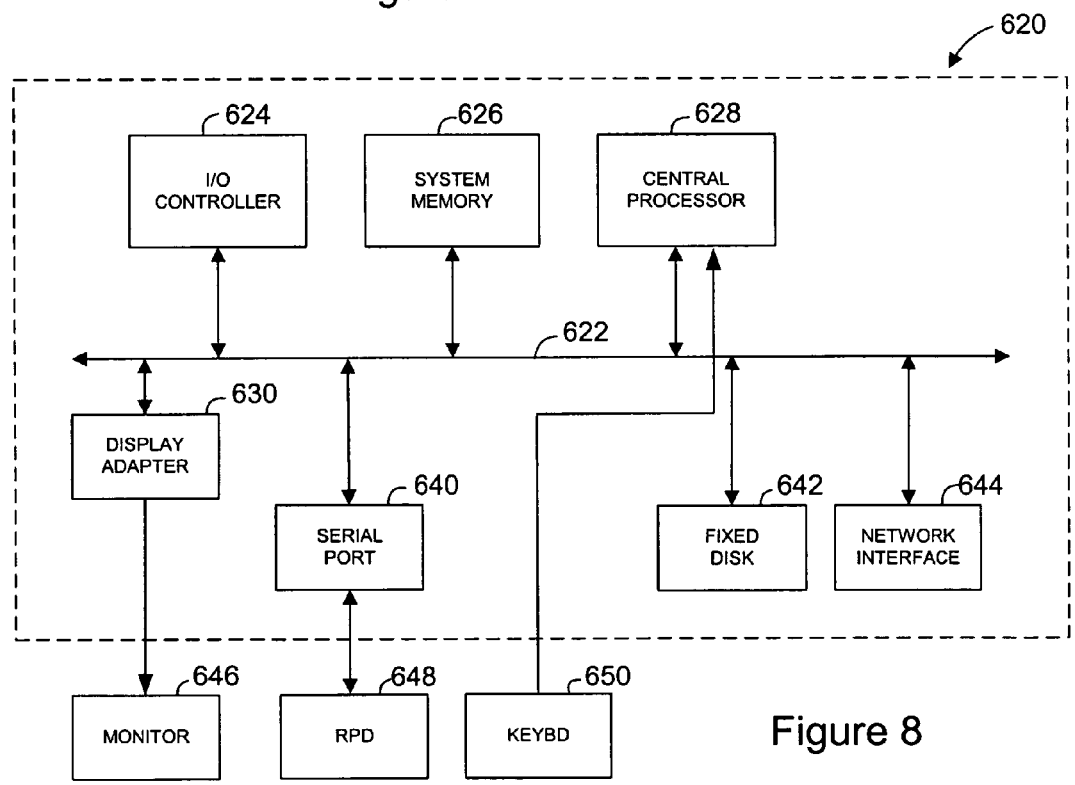
FIG. 8 shows basic subsystems in the computer system of FIG. 7.

FIGS. 7 and 8 illustrate basic hardware components suitable for practicing the present invention.

FIG. 7 is an illustration of computer system 601 including display 603 having display screen 605. Cabinet 607 houses standard computer components (not shown) such as a disk drive, CDROM drive, display adapter, network card, random access memory (RAM), central processing unit (CPU), and other components, subsystems and devices. User input devices such as mouse 611 having buttons 613, and keyboard 609 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention. Such suitable platforms can include consumer electronic devices such as an audio (e.g., mp3, wav) player, mobile or cell phone, etc.

FIG. 8 illustrates subsystems that might typically be found in a computer such as computer 1.

In FIG. 8, subsystems within box 620 are directly interfaced to internal bus 622. Such subsystems typically are contained within the computer system such as within cabinet 607 of FIG. 7. Subsystems include input/output (I/O) controller 624, System Memory (or random access memory "RAM") 626, central processing unit CPU 628, Display Adapter 630, Serial Port 640, Fixed Disk 642, Network Interface Adapter 644. The use of bus 622 allows each of the subsystems to transfer data among subsystems and, most importantly, with the CPU. External devices can communicate with the CPU or other subsystems via bus 622 by interfacing with a subsystem on the bus. Thus, Monitor 646 connects with Display Adapter 630, a relative pointing device (e.g. a mouse) connects through Serial Port 640. Some devices such as Keyboard 650 can communicate with the CPU by direct means without using the main data bus as, for example, via an interrupt controller and associated registers.

As with the external physical configuration shown in FIG. 7, many subsystem configurations are possible. FIG. 8 is illustrative of but one suitable configuration. Subsystems, components or devices other than those shown in FIG. 8 can be added. A suitable system can be achieved without using all of the subsystems shown in FIG. 8. Similarly, additional subsystems can be used.

Although specific embodiments of the invention have been described, variations of such embodiments are possible and are within the scope of the invention. For example, although documents and web pages have been presented as the target of searches, any type of record such as a file, database item or other object can be searched. Other types of objects, such as audio, image, executable program code, etc., can be the subject of features of the present invention where search engines provide search results for the objects.

A subsearch can include any type of search on a first set of search results. The first set of search results may be already obtained, not yet obtained, or partially obtained (including a search where results are continuing to come in). In some cases a first set of search results may not be completely defined at the time a subsearch is applied. Any type of searching, sorting, filtering or other criteria can be used in a subsearch. Any format for specifying the subsearch can be used. For example, voice input, slider controls, graphs, charts, images or other types of input and output can be used to specify a subsearch.

Although the invention is discussed primarily with respect to searches performed with the Internet, any suitable network, network topology, transmission protocols, sender-receiver devices and relationships, and other characteristics or properties of networks, electronic devices and processes can be used. For example, features of the invention can be employed on a smaller scale to local area networks (LANs), campus or corporate networks, home networks, etc., whether wired or wireless.

Although specific protocols may be used to describe embodiments herein, other embodiments can use other transmission protocols or standards. Use of the terms 'peer', 'client', and 'server' can include any type of device, operation, or other process. The invention can operate among any one or more processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the functionality of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments unless otherwise specified. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. The functions may be performed in hardware, software or a combination of both.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. Functions and parts of functions described herein can be achieved by devices in different places and operating at different times. For example, a processor can perform its functions in "real time," "offline," in a "batch mode," etc. Parallel, distributed or other processing approaches can be used.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Thus, the scope of the invention is to be determined solely by the appended claims.

The invention claimed is:

1. A method for displaying search results obtained from a search web site, wherein the search results comprise a web page described by a source text definition, the method comprising:

storing at least one field delimiter style corresponding to at least one of a plurality of search websites;

executing a search on at least one search website in response to a user-entered query;

receiving a search results web page from the search website;

identifying the search website and at least one field delimiter style corresponding to the website;

parsing the source text definition of the search results web page to determine multiple fields described by field delimiters in the source text definition, wherein parsing the source text definition is based at least in part on the at least one field delimiter style; and displaying corresponding fields in a format according to the parsed field delimiters, wherein the format is different from a format described by the source text definition.

2. The method of claim 1, wherein corresponding fields are displayed in columns.

3. The method of claim 1, wherein the field comprises one or more of the following: title, date, content, file type, file size, author.

4. The method of claim 1, wherein displaying corresponding fields in a format according to the parsed field delimiters comprises alphabetic ordering according to a keyword in a selected field.

5. The method of claim 1, wherein displaying corresponding fields in a format according to the parsed field delimiters comprises ordering according to a date.

6. The method of claim 1, wherein displaying corresponding fields in a format according to the parsed field delimiters comprises filtering results from the display.

7. The method of claim 6, further comprising:
accepting a signal from a user input device to filter results according to a value in one or more individual fields.

8. The method of claim 6, further comprising:
accepting a signal from a user input device to filter results according to a value range in one or more individual fields.

9. The method of claim 1, further comprising:
accepting a signal from a user input device to hide a column.

10. The method of claim 1, further comprising:
accepting a signal from a user input device to change a left-to-right position of a column.

11. The method of claim 1 wherein parsing the source text definition to determine multiple fields includes determining a first field and a second field, and wherein a portion of the first field is used as a value in the second field.

12. The method of claim 1, wherein at least one of the field delimiters indicates a date.

13. The method of claim 1, wherein at least one of the field delimiters indicates an author's name.

14. The method of claim 1, further comprising:
obtaining successive search results web pages having additional search results; and
storing the search results web pages locally on a computer that is being used to display the fields.

15. The method of claim 1, further comprising:
obtaining successive search results web pages having additional search results; and
updating the display by using the additional search results in addition to the received search results web page.

16. The method of claim 1 wherein identifying the search website comprises recognizing a search website into which the user-entered query was submitted.

17. An apparatus for displaying a search results web page from a search website, wherein the search results web page is described by a source text definition, the apparatus comprising:
a processor configured to execute instructions; and
a computer-readable storage device containing
    at least one field delimiter style corresponding to each of a plurality of search results web pages from a plurality of different search websites;
    one or more instructions for executing a search on the search website and receiving a search results web page;
    one or more instructions for identifying the received search results web page as obtained from at least one of the plurality of search websites, and for identifying at least one corresponding field delimiter style;
    one or more instructions for parsing the source text definition of the web page to determine multiple fields based, at least in part, on the corresponding field delimiter style;
    one or more instructions for displaying the multiple fields in a format different from a format described by the source text definition; and
    one or more instructions for accepting a signal from a user input device to reorder the displayed fields according to the file type.

18. The apparatus of claim 17 wherein the instructions for identifying the received search results web page comprises identifying the search website as at least one of www.google.com, www.yahoo.com, www.alltheweb.com, and www.askjeeves.com.

19. A computer-readable storage device including instructions for displaying a search results web page from a search engine, wherein the search results web page is described by a source text definition, the computer-readable storage device comprising instructions for causing a computer to perform a method comprising:
storing at least one field delimiter style corresponding to each of a plurality of search results web pages generated by at least one of a plurality of search engines;
executing a search by submitting a user-generated query to a search engine;
receiving search results in the form of a web page;
identifying the search engine and the at least one field delimiter style corresponding to the web page;
parsing the source text definition of the web page to determine multiple fields at least in part according to the at least one field delimiter style; and
displaying the multiple fields in a format different from a format described by the source text definition.

20. The computer-readable storage device of claim 19, wherein the source text definition includes hyper text markup language (HTML).

21. The computer-readable storage device of claim 19, wherein the source text definition comprises a first source text definition, and wherein the displaying multiple fields in a format different from a format described by the source text definition further comprises:
generating a second source text definition describing a second web page; and
displaying the second web page according to the second source text definition.

22. A method for displaying web page search results, the method comprising:
storing at least one field delimiter style corresponding to a plurality of search websites;

executing a search on a search website after receiving a user-generated query;

receiving a web page of search results wherein the web page comprises a source text definition;

identifying the search website and a corresponding field delimiter style;

parsing the source text definition at least in part according to the corresponding field delimiter style; and displaying the web page with a column corresponding to each field denoted by a recognized field delimiter within the source text definition.

23. The method of claim 22 wherein identifying the search website comprises recognizing the search website on which the search is executed.

24. The method of claim 22 wherein the search website is at least one of www.google.com, www.yahoo.com, www.alltheweb.com, and www.askjeeves.com.

25. The method of claim 22, further comprising:
recognizing a content field associated with a title of a field; and
displaying a column with the title of the field as a column title.

26. The method of claim 22 wherein a field delimiter indicates a change in at least one of the following: text format, layout format, or image format.

27. The method of claim 22 wherein at least one field delimiter indicates a hyperlink.

28. The method of claim 22 wherein a field comprises at least one of the following: title, date, content, file type, file size, and author.

29. The method of claim 22, further comprising receiving an input signal from a user input device with instructions to reorder the displayed fields.

30. The method of claim 22, further comprising filtering results from display.

31. The method of claim 22 wherein filtering results comprises removing at least one column from the display.

32. The method of claim 22, further comprising:
obtaining successive web pages having additional search results; and
incorporating the additional search results into the display.

33. The method of claim 22, further comprising:
recognizing at least one content portion from the source text definition; and
populating at least one column with the at least one content portion.

* * * * *